(12) United States Patent
Mapkar et al.

(10) Patent No.: US 8,039,547 B2
(45) Date of Patent: Oct. 18, 2011

(54) COMPOSITIONS FOR COATING ELECTRICAL INTERFACES INCLUDING A NANO-PARTICLE MATERIAL AND PROCESS FOR PREPARING

(75) Inventors: Javed Abdurrazzaq Mapkar, Farmington Hills, MI (US); Xin Zhou, Franklin Park, PA (US); Alaa Abdel-Azim Elmoursi, Troy, MI (US); James Jeffery Benke, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 120 days.

(21) Appl. No.: 12/406,506

(22) Filed: Mar. 18, 2009

(65) Prior Publication Data

US 2010/0240829 A1 Sep. 23, 2010

(51) Int. Cl.
*C08L 83/04* (2006.01)
(52) U.S. Cl. ........... 524/588; 524/424; 977/753; 241/16
(58) Field of Classification Search .................. None
See application file for complete search history.

(56) References Cited

U.S. PATENT DOCUMENTS

| 5,147,988 A | 9/1992 | Appleton |
| 6,034,860 A | 3/2000 | Shea |
| 6,437,274 B2 | 8/2002 | Claessens et al. |
| 7,264,869 B2 * | 9/2007 | Tobita et al. .................. 428/323 |
| 7,378,759 B2 | 5/2008 | Meinherz et al. |
| 7,550,548 B2 * | 6/2009 | Hatanaka et al. ............... 528/34 |
| 2004/0000836 A1 | 1/2004 | Okubo et al. |
| 2007/0007661 A1 * | 1/2007 | Burgess et al. ............... 257/778 |
| 2007/0155136 A1 | 7/2007 | Chrysler et al. |
| 2010/0009160 A1 * | 1/2010 | Noguchi et al. ........... 428/297.4 |
| 2010/0079234 A1 * | 4/2010 | Chen et al. ................... 338/22 R |
| 2010/0255279 A1 * | 10/2010 | Hong ............................ 428/217 |

FOREIGN PATENT DOCUMENTS

| JP | 08-176445 A | * | 7/1996 |
| WO | WO 2008/025962 | * | 3/2008 |

OTHER PUBLICATIONS

"Polymer Nanocomposites by Pulverizization: Enhanced Properties and Dispersion" authored by Kasimatis et al. ANTEC 2005 Plastics: Annual Technical Conference, vol. 2: Materials.. Society of Plastics Engineers. Online version available at: http://www.knovel.com/web/portal/browse/display?_EXT_KNOVEL_DISPLAY_bookid=1219&VerticalID=0.*
Entitled "Polymers and carbon Nanotubes—Dimensionality, Interactions and Nanotechnology" authored by Szeifer et al. and published in Polymer (2005) 46, 7803-7818.*
Product data sheet for Momentive TSE3070 (no date).*
Abstract for JP 08-176445 A (Jul. 1996).*
Abstract for CN 101412839 A (Apr. 2009).*

* cited by examiner

*Primary Examiner* — Marc Zimmer
(74) *Attorney, Agent, or Firm* — Martin J. Moran

(57) ABSTRACT

A composition for coating a surface of an electrical contact includes a polymer matrix comprising elastomer, at least one nano-particle material, and crosslinker.

1 Claim, 4 Drawing Sheets

COMPOSITIONS FOR COATING ELECTRICAL INTERFACES INCLUDING A NANO-PARTICLE MATERIAL AND PROCESS FOR PREPARING

BACKGROUND

1. Field

The disclosed concept relates to compositions for electrical interfaces and, more particularly, to compositions for coating a surface of an electrical contact. The disclosed concept also relates to processes for producing nano-particle compositions.

2. Background Information

It is known to deposit an electroplating layer of nickel, silver or tin on the surface of electrical interfaces, such as bolted joints and sliding contacts, to form a coating thereon. The primary function of the coating is to reduce the oxidation of the electrical interfaces which can result in more stable contact electrical resistance over the operating life time of the electrical joint or contact. These coatings are not known to reduce the contact electrical resistance or improve the thermal transport properties across the electrical interface.

Thus, there is a need for a coating or layer that is capable of reducing the contact electrical resistance at the electrical interface and reducing the heat generated at the joint to lead to the reduction of the peak operating temperature for a given current rating. In addition, it is desirable to increase the thermal conductivity at the interface to assist in enhancing the heat dissipation away from the joint which can also result in a reduction of peak temperature at the joint.

SUMMARY

These needs and others are met by embodiments of the disclosed concept, which provide a composition for coating an electrical contact interface, the composition including a polymer matrix comprising an elastomer, a nano-particle material selected from the group consisting of carbon-containing nano-particles, metal nanowires, and mixtures thereof, and a crosslinker. For example, this increases the thermal and electrical transport properties at the electrical contact interface to increase safety and reliability of electrical products including the electrical interface.

The elastomer may be selected from the group consisting of silicone elastomers, fluoro elastomers, and mixtures thereof. Further, the elastomer may be selected from the group consisting of fluorosilicone, poly(dimethylsiloxane), and mixtures thereof.

The carbon-containing nano-particles may be selected from the group consisting of carbon nanotubes, carbon nanofibers, and mixtures thereof.

The nano-particle material may be present in an amount of from 2 to 80 percent by weight of the composition, or from 5 to 50 percent by weight of the composition.

The crosslinker may include polydiethoxysiloxane. The crosslinker may be present in an amount of from 1 to 15 percent by weight of the composition.

The elastomer may have a molecular weight of from 800 to 100,000 g/mole.

The composition may further include catalyst. The catalyst may be selected from the group consisting of platinum, diamine, bisphenol, peroxide, dialkyltincarboxylate, and mixtures thereof. The catalyst may be present in an amount of from 1 to 15 percent by weight of the composition.

As another aspect, the disclosed concept provides a process for preparing a nano-particle composition, including (a) mixing nano-particle material selected from the group consisting of carbon-containing nano-particles, metal nanowires, and mixtures thereof, and polymer matrix including an elastomer, (b) adding crosslinker to the mixture of step (a); and (c) curing the mixture of step (b).

The carbon-containing nano-particles may be selected from the group consisting of carbon nanotubes, carbon nanofibers, and mixtures thereof.

The crosslinker may include polydiethoxysiloxane.

The elastomer may be selected from the group consisting of silicone elastomers, fluoro elastomers, and mixtures thereof. Further, the elastomer may be selected from the group consisting of fluorosilicone, poly(dimethylsiloxane), and mixtures thereof.

The process may further include adding catalyst to the mixture of (a). The process may further include molding the mixture of (b) into a desired shape. The resultant composition may be in the form of a sheet.

The process may further include grinding the nano-particle material prior to mixing with the polymer matrix.

As another aspect, the disclosed concept provides an electrical interface having a first contact surface and a second contact surface wherein at least one of the first and second contact surfaces comprises the composition as described above.

As still another aspect, the disclosed concept provides a process for preparing an electrical interface having a first contact surface and a second contact surface, including applying to at least one contact surface the composition as described above.

As yet another aspect, the disclosed concept provides a process for preparing an electrical interface having a first contact surface, a second contact surface, comprising positioning a nano-particle sheet between the first and second contact surfaces, wherein the sheet comprises the composition as described above.

BRIEF DESCRIPTION OF THE DRAWINGS

A full understanding of the disclosed concept can be gained from the following description of the preferred embodiments when read in conjunction with the accompanying drawings in which.

DETAILED DESCRIPTION

Figure 1A:
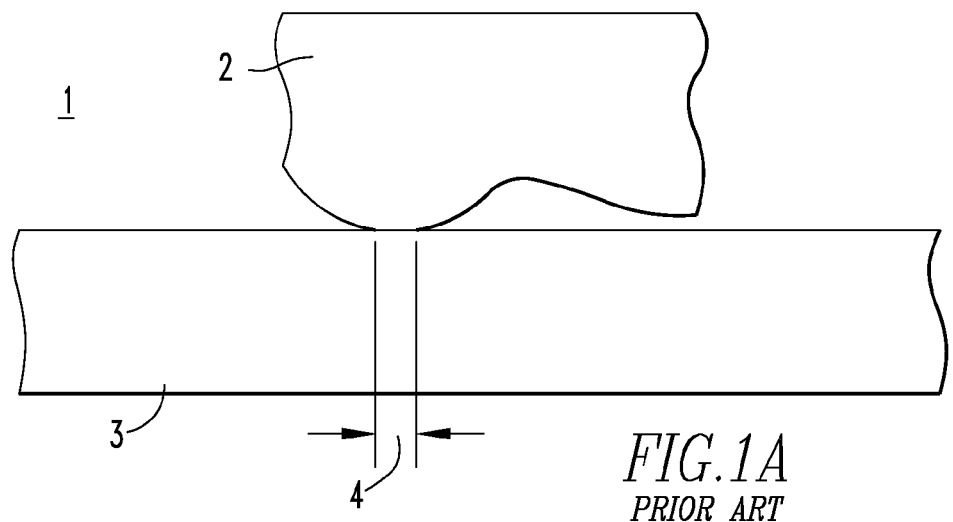
FIG. 1A is a side view of an electrical interface.

As employed herein, the term "power conductor" means a power bus bar, a power line, a power phase conductor, a power cable, and/or a power bus bar structure for a power source, a circuit interrupter or other switchgear device.

As employed herein, the term "fastener" means any suitable connecting or tightening mechanism expressly including, but not limited to, screws (e.g., without limitation, set screws), bolts and the combinations of bolts and nuts (e.g., without limitation, lock nuts) and bolts, washers and nuts.

As employed herein, the statement that two or more parts are "coupled" or "connected" together shall mean that the parts are joined together either directly or joined through one or more intermediate parts.

Directional phrases used herein, such as, for example, left, right, top, bottom, upper, lower, front, back, forward, above, below, clockwise, counterclockwise and derivatives thereof, relate to the orientation of the elements shown in the drawings and are not limiting to the claims unless expressly recited therein.

As employed herein, the term "number" shall mean one or an integer greater than one (i.e., a plurality).

The disclosed concept relates to compositions for coating electrical interfaces including forming a nano-particle layer. The presence of the nano-particle layer can result in at least one of an improvement in the thermal and electrical transport properties at the interface of electrical contacts such as, for example but not limited to, bolted joints and sliding contacts.

Figure 1B:
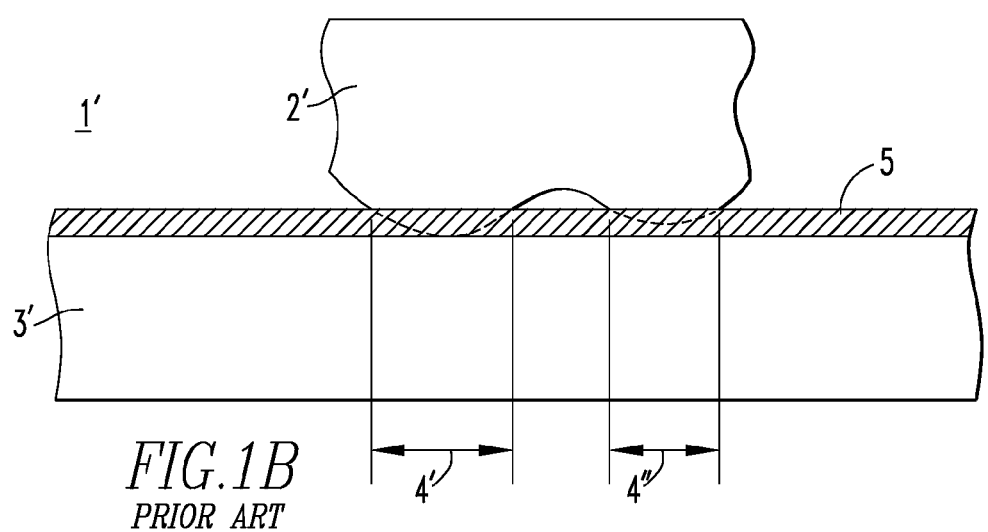
FIG. 1B is a side view of an electrical interface in accordance with embodiments of the disclosed concept.

FIGS. 1A and 1B are side views of an electrical interface 1,1' including a first conductor 2,2' and a second conductor 3,3', respectively. Such first and second conductors are typically, for example, made of copper, aluminum or mixtures thereof. FIG. 1A shows the prior art where the first and second conductors 2,3 are in direct contact with each other resulting in contact area 4. FIG. 1B shows an embodiment of the disclosed concept where the second conductor 3' includes a nano-particle layer 5 and therefore, first conductor 2' is in direct contact with nano-particle layer 5 resulting in contact areas 4' and 4".

Figure 2:
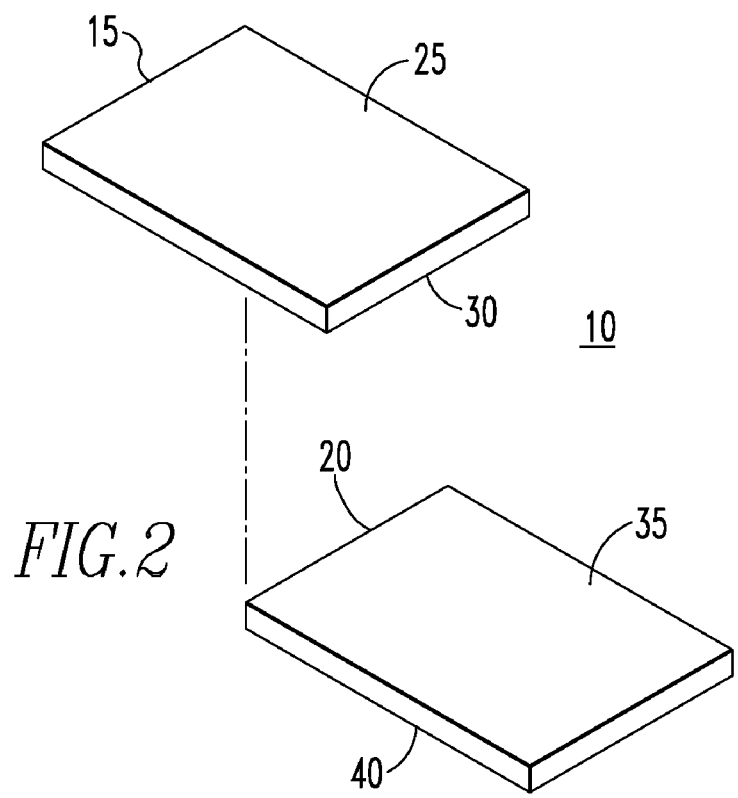
FIG. 2 is an exploded schematic layout of an electrical interface in accordance with another embodiment of the disclosed concept.

FIG. 2 is an exploded schematic layout of electrical interface 10 including first conductor 15 and second conductor 20. First and second conductors 15,20 can be made of a wide variety of conductive materials such as, for example but not limited to, copper, aluminum, and mixtures thereof. First conductor 15 has upper surface 25 and lower surface 30. Second conductor 20 has upper surface 35 and lower surface 40. Opposite lower surface 30 of first conductor 15 and upper surface 35 of second conductor 20 are electrically connected together.

Figure 2A:
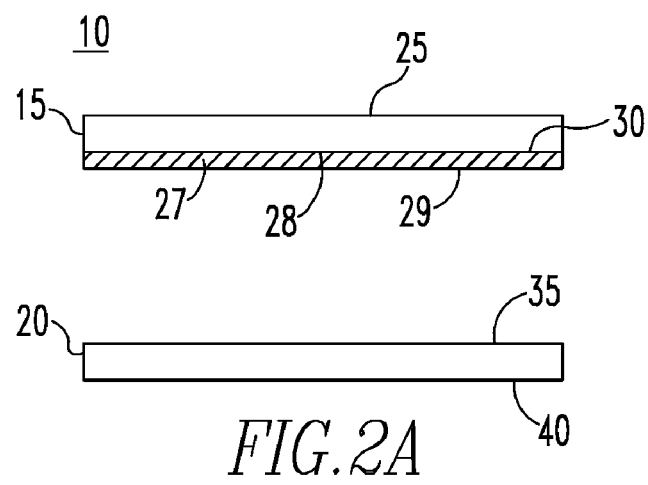
FIG. 2A is an exploded side view of the electrical interface of FIG. 2.

Referring to FIG. 2A, the electrical interface 10 includes nano-particle layer 27 having first surface 28 and opposite second surface 29. Nano-particle layer 27 is connected to lower surface 30 of first conductor 15. First surface 28 of nano-particle layer 27 is electrically coupled to lower surface 30 of first conductor 15 and upper surface 35 of second conductor 20 is electrically coupled to opposite second surface 29 of nano-particle layer 27. Although one example configuration is shown in FIG. 2A, it should be understood that alternatively nano-particle layer 27 can be connected to upper surface 35 of second conductor 20, or a nano-particle layer can be connected to both lower surface 30 of first conductor 15 and upper surface 35 of second conductor 20.

Nano-particle layer 27 is made of nano-particle material selected from carbon-containing nano-particles, metal nanowires, and mixtures thereof. Carbon-containing nano-particles include carbon nanotubes. Carbon nanotubes and/or metal nanowires can exhibit excellent thermal and electrical conductivity properties.

Suitable carbon nanotubes for use in the disclosed concept include single-wall carbon nanotubes, multi-wall carbon nanotubes, and mixtures thereof. The carbon nanotubes can be prepared using a variety of conventional methods known in the art. For example, the carbon nanotubes can be prepared using chemical vapor deposition (CVD) processing to grow the carbon nanotubes. The carbon nanotubes can be grown directly on a surface interface (e.g., conductor surfaces 30 and/or 35 as shown in FIG. 2A) to form a nano-particle layer (e.g., nano-particle layer 27 as shown in FIG. 2A). The surface interface can be made of a wide variety of materials including, but not limited to, copper, aluminum, and mixtures thereof. The surface interface is typically cleaned to remove any surface grease and a suitable catalyst then is applied to the cleaned surface. Suitable catalysts include, for example but are not limited to, aluminum, nickel, iron, and mixtures thereof. The catalyst can be applied by a wide variety of conventional techniques known in the art. Suitable techniques include, for example but are not limited to, sputter deposition. Following application of the catalyst, CVD processing is carried out using carbon bearing gases such as, for example but not limited to, methane, ethane, and mixtures thereof.

As a non-limiting example, the concentration of the carbon nanotubes in the nano-particle layer is up to about one (1) billion/$cm^2$.

As another example, the nano-particle material includes metal nanowires. The metal nanowires can be produced using a variety of methods known in the art including, for example but not limited to, growing metal and metal oxide nanowires using electroplating or CVD processing. Suitable metals include, for example but are not limited to, zinc, nickel, silver, tin, and mixtures thereof. The metal nanowires can be grown directly on a surface interface (e.g., conductor surfaces 30 and/or 35 as shown in FIG. 2A) to form a nano-particle layer (e.g., nano-particle layer 27 as shown in FIG. 2A). The above description relating to suitable surface interfaces for use and steps in preparing the substrate (e.g, cleaning and applying a catalyst thereon) is equally applicable in this context. The metal nanowires can be grown by electroplating in an appropriate electrolyte solution.

Figure 3:
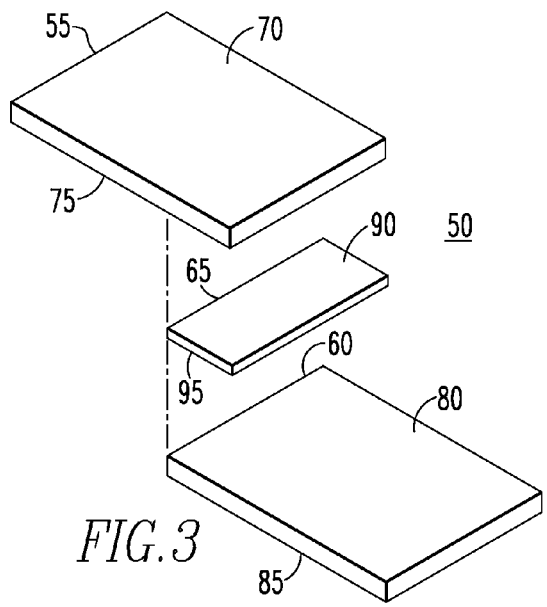
FIG. 3 is an exploded schematic layout of an electrical interface in accordance with another embodiment of the disclosed concept.

FIG. 3 is an exploded schematic layout of electrical interface 50 including first conductor 55, second conductor 60 and substrate 65. Substrate 65 is positioned between first and second conductors 55,60. First and second conductors 55,60 can be made of the materials described above for first and second conductors 15,20 of FIG. 2. First conductor 55 has upper surface 70 and lower surface 75. Second conductor 60 has upper surface 80 and lower surface 85. Substrate 65 has first surface 90 and opposite second surface 95.

Figure 3A:
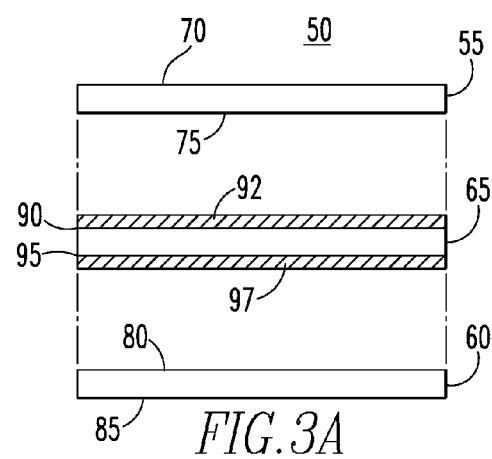
FIG. 3A is an exploded side view of the electrical interface of FIG. 3.

FIG. 3A shows the electrical interface 50 including nano-particle layers 92,97. Nano-particle layer 92 is coupled to first surface 90 of substrate 65 and nano-particle layer 97 is coupled to opposite second surface 95 of substrate 65. Substrate 65 is made, for example, of a metal foil. Suitable metal foils can include a wide variety of materials known in the art. For example, the metal foil itself can be grown by electroplating. Non-limiting examples can include, but are not limited to, copper, aluminum, noble metals such as silver, and mixtures thereof. Nano-particle layers 92,97 can be made of nano-particle material as described above. The nano-particle material can be grown directly on first surface 90 and opposite second surface 95 of substrate 65. The growth process can include using CVD processing as described above. The nano-particle layer 92 on first surface 90 of substrate 65 is electrically coupled to lower surface 75 of first conductor 55, and upper surface 80 of second conductor 60 is electrically coupled to nano-particle layer 97 on opposite second surface 95 of substrate 65. Although one example configuration is shown, it should be understood that alternatively only one of first surface 90 and opposite second surface 95 may include a nano-particle layer (e.g., 92 or 97).

For example, at least one of lower surface 75 of first conductor 55 and upper surface 80 of second conductor 60 can also include a nano-particle layer (not shown).

Figure 4:
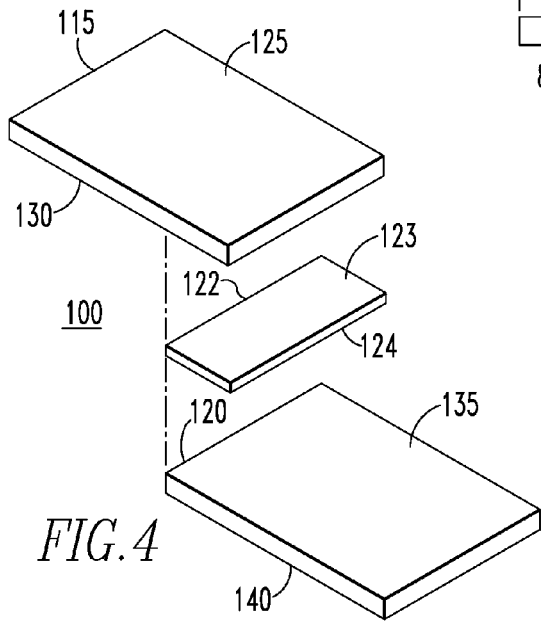
FIGS. 4 and 5 are exploded schematic layouts of electrical interfaces in accordance with other embodiments of the disclosed concept.

FIG. 4 is an exploded schematic layout of electrical interface 100 including first conductor 115, second conductor 120, and substrate 122. Substrate 122 is positioned between first conductor 115 and second conductor 120. First and second conductors 115,120, can be made of the same materials as described above for first and second conductors 15,20 of FIG. 2. First conductor 115 has upper surface 125 and lower surface 130. Second conductor 120 has upper surface 135 and lower surface 140. Substrate 122 has first surface 123 and opposite second surface 124. Substrate 122 is a nano-particle layer which is made of at least one sheet including carbon-containing nano-particles, metal nanowires, and mixtures thereof. The carbon-containing nano-particles include carbon nanotubes, carbon nanofibers, or mixtures thereof. Suitable sheets for use can include known nano-particle layers such as, for example but not limited to, buckypaper. Buckypaper can be prepared by dispersing and filtering a suspension containing carbon nanotubes and/or carbon nanofibers. Buckypaper can exhibit good thermal and electrical conductivity. First surface 123 of substrate 122 is electrically coupled to lower surface 130 of first conductor 115, and upper surface 135 of second conductor 120 is electrically coupled to opposite second surface 124 of substrate 122.

As a non-limiting example, the sheet of nano-particle material such as, but not limited to, carbon nanotubes and/or carbon nanofibers, can be prepared using an elastomer as the polymer matrix. A silanol cure condensation polymerization technique can be employed. The carbon nanotubes and/or carbon nanofibers are preferably uniformly mixed into an elastomer. The carbon nanotubes and/or carbon nanofibers can be purified and/or grinded prior to mixing into the elastomer. The nano-particle material, such as but not limited to, carbon nanotubes and/or carbon nanofibers, can be present in the mixture in varying amounts. For example, the nano-particle material can be present in an amount of from greater than 0 to less than 100 percent by weight of the mixture. In preferred embodiments, the nano-particle material can be present in an amount of from 2 to 80 percent by weight of the mixture, or from 5 to 50 percent by weight of the mixture. A variety of conventional devices can be used to mix together the ingredients. Suitable mixing devices include, but are not limited to, extruders and speed mixers. Suitable elastomers can include a variety of materials known in the art such as, but not limited to, silicone elastomers, fluoro elastomers, and mixtures thereof. Non-limiting examples include fluorosilicone, poly(dimethylsiloxane), and mixtures thereof. In one embodiment, the elastomer has a molecular weight of from 800 g/mole to 100,000 g/mole. The elastomer can be in a substantially liquid or solid form. The mixture also includes a crosslinker and optionally catalyst. The crosslinker and catalyst can be selected from materials known in the art. A non-limiting example of a suitable crosslinker includes, but is not limited to, polydiethoxysiloxane. Non-limiting examples of suitable catalysts include, but are not limited to, platinum, diamine, bisphenol, peroxide, dialkyltincarboxylate, and mixtures thereof. The amount of crosslinker and catalyst can vary. For example, the crosslinker can be present in an amount of from 1 to 15 percent by weight of the mixture. When catalyst is used, for example, it can be present in an amount of from 1 to 15 percent by weight of the mixture.

The mixture is pressed into a desired shape under load using a device such as a die. The mixture can be molded into essentially any shape including, but not limited to, square, circle, rectangle, and combinations thereof. For example, holes are punched into the shaped mixture for use in bolted connections (e.g., electrical interface 100 as shown in FIG. 4). The shaped mixture then is allowed to cure to form a resultant substantially flexible nano-particle material (e.g., carbon nanotube and/or nanofiber) sheet. The cure can be carried out under a variety of conventional temperature and pressure conditions which are known in the art for curing elastomer materials. In one embodiment, the cure is conducted at ambient temperature, for example but not limited to, 18° C.-23° C., and/or under atmospheric air conditions. In another embodiment, the cure is conducted at an elevated temperature. This method can provide advantages over known methods due to the ease of preparing the sheet and the ability to scale the process for mass production. The resultant sheet is substantially flexible and can have a nano-particle material (e.g., carbon nanotube and/or carbon nanofiber) loading of up to 50 percent by weight of the sheet.

For example, the at least one sheet can also include metal nanowires.

Figure 5:
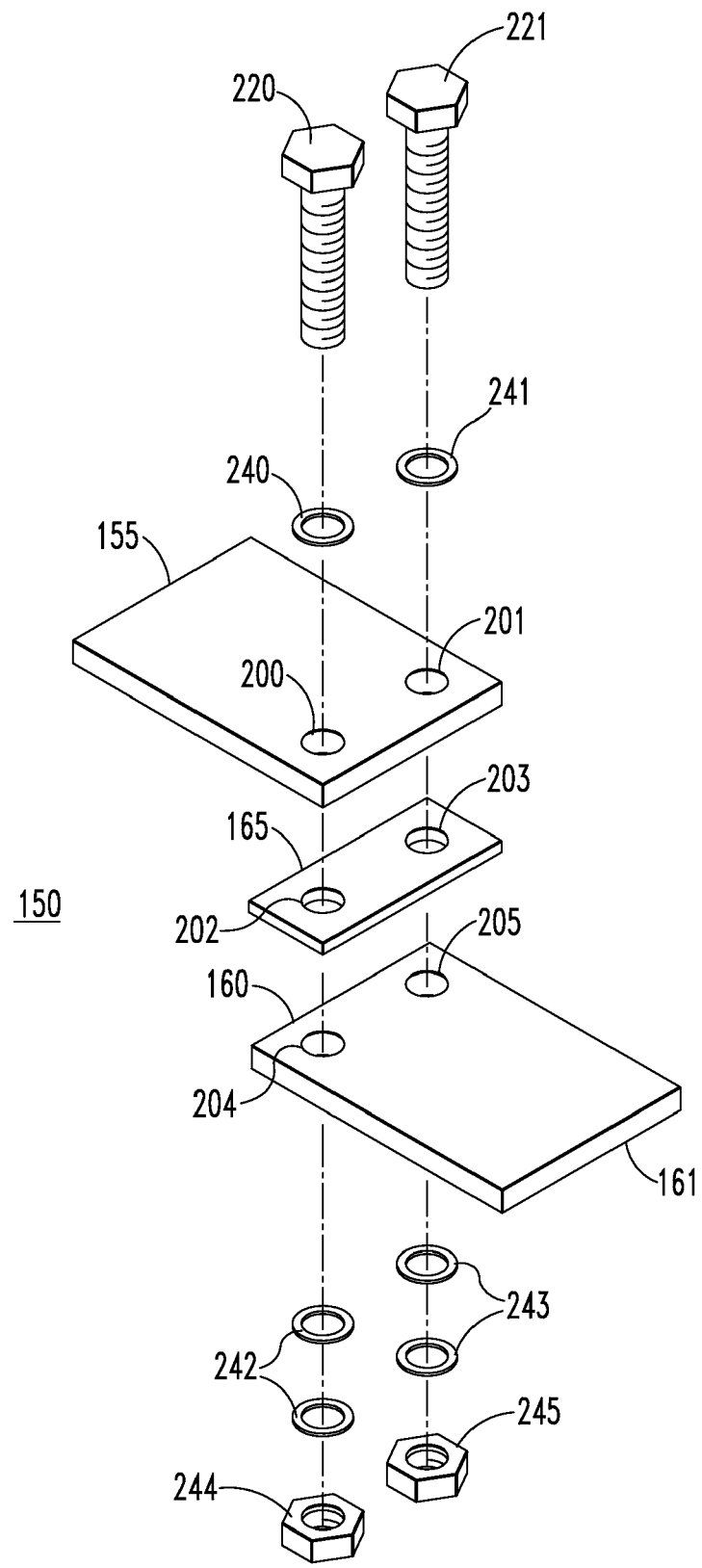

FIG. 5 is an exploded schematic layout of electrical interface 150 including first conductor 155, second conductor 160, and substrate 165. Substrate 165 is positioned between first conductor 155 and second conductor 160. First and second conductors 155,160 can be made of the same materials as described above for conductors 15,20 of FIG. 2. Substrate 165 can be made of the same materials as described above for substrates 65,122. First and second conductors 155,160 are electrically coupled together. Further, first and second conductors 155,160 are mechanically coupled together by fasteners. Suitable fasteners can include a wide variety known in the art including, but not limited to, those previously described herein. As shown in FIG. 5, openings 200 and 201 are made in first conductor 155; openings 202 and 203 are made in substrate 165; and openings 204 and 205 are made in second conductor 160. The openings 200,201,202,203,204, 205 can be made using any conventional technique such as drilling. Openings 200,202 and 204 are vertically aligned, and openings 201,203 and 205 are vertically aligned. Screws or bolts 220,221 are coupled together with washers 240 and 241, respectively, and inserted in each of openings 200,201 and through openings 202,203 and through openings 204, 205, respectively. Washers 240,241 and 242,243 and nuts 244,245 are coupled to screws or bolts 220,221, respectively, on lower surface 161 of second conductor 160.

For example and without limitation, the electrical interface 150 forms a bolted joint of a power conductor.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A process for producing a nano-particle composition, comprising:
   a. mixing at least one nano-particle material selected from the group consisting of carbon-containing nano-particles, metal nanowires, and mixtures thereof, and polymer matrix comprising silicone elastomer, fluoro elastomer, or mixtures thereof;
   b. adding crosslinker to the mixture of (a);
   c. curing at ambient temperature the mixture of (b); and
   d. further comprising grinding the nano-particle material prior to mixing with the polymer matrix.

* * * * *